United States Patent [19]

Dugle et al.

[11] 4,033,285
[45] July 5, 1977

[54] AUTOMATIC OVERHEAD RAIL CLEANER AND OILER

[75] Inventors: Thomas E. Dugle; Thomas L. Webb, both of Cincinnati, Ohio

[73] Assignee: Klenco Corporation, Massillon, Ohio

[22] Filed: Aug. 10, 1976

[21] Appl. No.: 713,137

[52] U.S. Cl. .................................. 118/4; 15/21 E; 15/77; 118/72; 118/307
[51] Int. Cl.[2] ...................... B05C 5/00; E01H 8/00
[58] Field of Search ................ 118/4, 70, 72, 305, 118/307; 15/21 E, 77; 198/496, 500; 184/14, 21, 26

[56] References Cited

UNITED STATES PATENTS

| | | | |
|---|---|---|---|
| 2,264,048 | 11/1941 | McMahon et al. | 118/307 |
| 3,625,181 | 12/1971 | Weaver | 118/305 X |
| 3,641,618 | 2/1972 | Rainey et al. | 15/77 X |
| 3,806,979 | 4/1974 | Bonami | 15/77 X |

*Primary Examiner*—John P. McIntosh
*Attorney, Agent, or Firm*—Hamilton, Renner & Kenner

[57] ABSTRACT

An automatic cleaner for overhead conveyor rails which has independently driven wheels riding on the rail and supporting a carriage having vertically disposed rotatable brushes which are axially rotated for progressively cleaning opposite sides of the rail as the carriage traverses the rail in either direction. The brushes are automatically adjusted vertically while rotating to avoid interference with rail hanger brackets and other obstructions on the rail.

19 Claims, 16 Drawing Figures

AUTOMATIC OVERHEAD RAIL CLEANER AND OILER

BACKGROUND OF THE INVENTION

In meat processing plants the strictest sanitary conditions are required, and overhead conveyor rails on which the animal carcasses and meat products are moved through the plant must be maintained clean and sanitary at all times. Originally, this was done by hand and recently automatic rail cleaners have been proposed, the most pertinent of which, to our knowledge, is that disclosed in U.S. Pat. No. 3,786,779.

Certain difficulties were present in the construction of said patent; for example, the vertical adjustment of the brushes on splined shafts required more clearance above the rail than is normally available in meat processing plants, the supporting wheels did not float properly to accommodate unevenness and curvature of the rails, the movement of the carriage was not smooth and positive in both directions as only one supporting wheel was driven, and the location of a photocell and its light source for controlling the vertical adjustment of the brushes did not closely follow the path of the conveyor rail on a curve.

SUMMARY OF THE INVENTION

The improved automatic overhead rail cleaner comprises an upright post for extending alongside the conveyor rail and having a laterally movable crosshead in which two independently driven wheels for riding the rail are floatingly mounted. Within the post is a housing interconnecting a pair of axially rotatable vertically movable brushes for contacting opposite sides of the rail, the vertical movement raising the brushes to clear obstructions on the rail. The base of the post is secured to a housing enclosing a piston and cylinder arrangement in which the piston is controlled by means such as a photocell for sensing obstructions on the rail to actuate the vertical movement of the brushes, and a motor rotates the cylinder to cause axial rotation of the brushes and also drives a pump to spray oil on the rail. A battery box hung from the housing contains the power supply for the entire operation. Suitable electronic circuitry is preferably provided to control the driving means and all functions of the operation.

It is a general object of the present invention to provide an improved rail cleaner which obviates the difficulties had with known prior constructions.

A specific object is to provide an improved rail cleaner which is operable within minimal clearance above the rail.

Another object is to provide an improved rail cleaner which is adapted to follow and clean curved and uneven rail surfaces.

A further object is to provide an improved rail cleaner which has sensing means adapted to function accurately on curved rails and rails having obstructions.

A still further object is to provide an improved rail cleaner which is compact, durable, has self-contained power supply and is easily maintained and repaired.

These and other objects are accomplished by the improvements comprising the present invention, a preferred embodiment of which is shown by way of example in the accompanying drawings and described in detail in the following specification. Various modifications and changes in details of construction are intended to be included within the scope of the appended claims.

DESCRIPTION OF A PREFERRED EMBODIMENT

Figure 1:
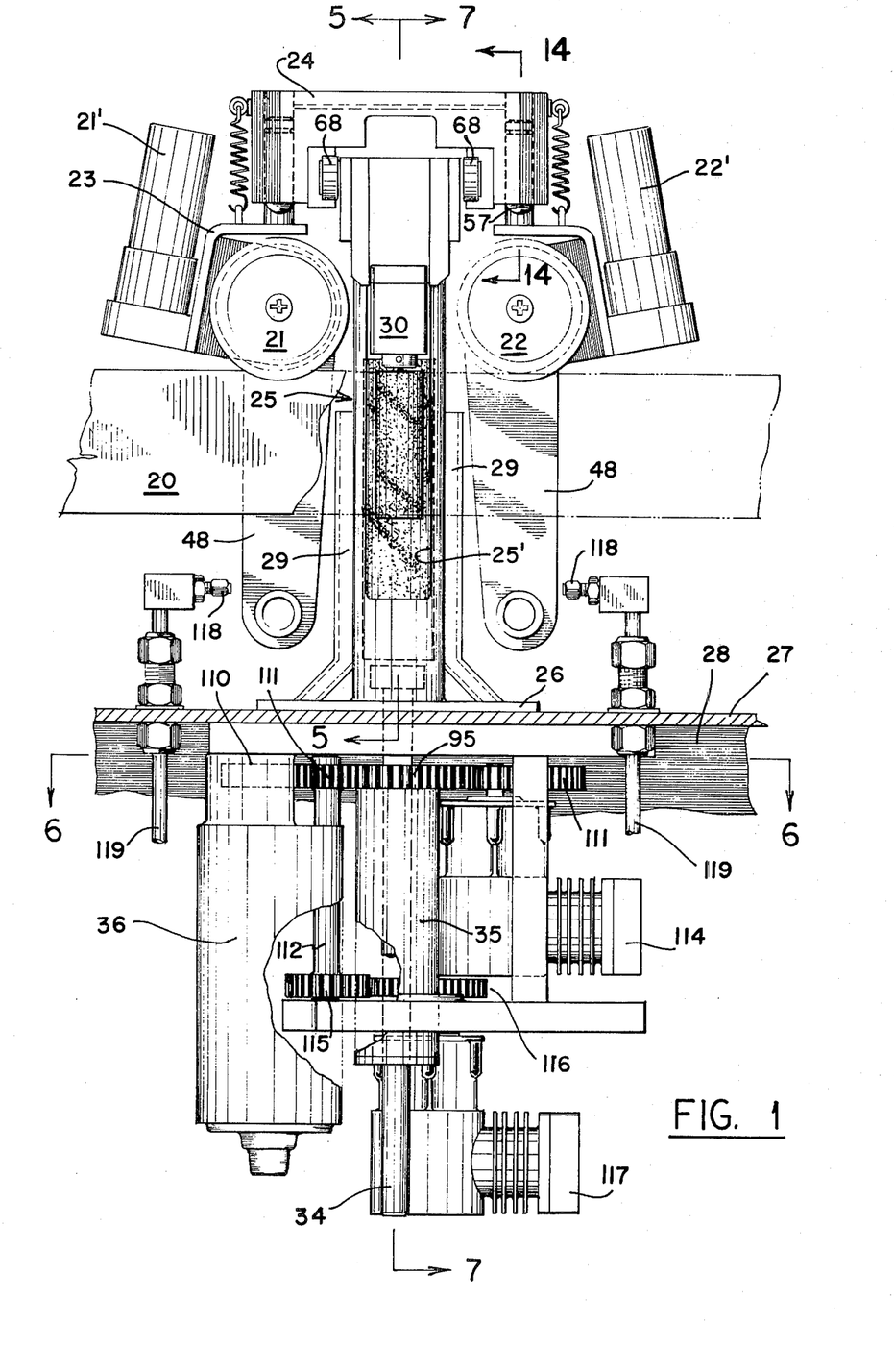
FIG. 1 is a side elevation of the improved rail cleaner showing the brushes in lowered position, with the housing broken away and in section.

Referring first to FIG. 1, the improved rail cleaner is shown supported on a conveyor rail 20 by two flanged wheels 21 and 22 which are rotatably mounted on brackets 23 and the brackets are floatingly supported in a crosshead 24. The wheels 21 and 22 are independently driven by electric motors 21' and 22', respectively, also mounted on the brackets 23, in a manner to be described.

The crosshead 24 is laterally movably mounted on the upper end of an upright post or mast of tubular cross section indicated generally at 25 having a base plate 26 secured to the top wall or plate 27 of a housing 28. Conduits 29 extend upwardly from the base part way along the sides of the post 25 for encasing electrical wires extending from within housing 28 to supply current to the motors 21' and 22'. A battery box (not shown) may be suspended from housing 28 to supply electric current to the mechanism therein.

Figure 2:
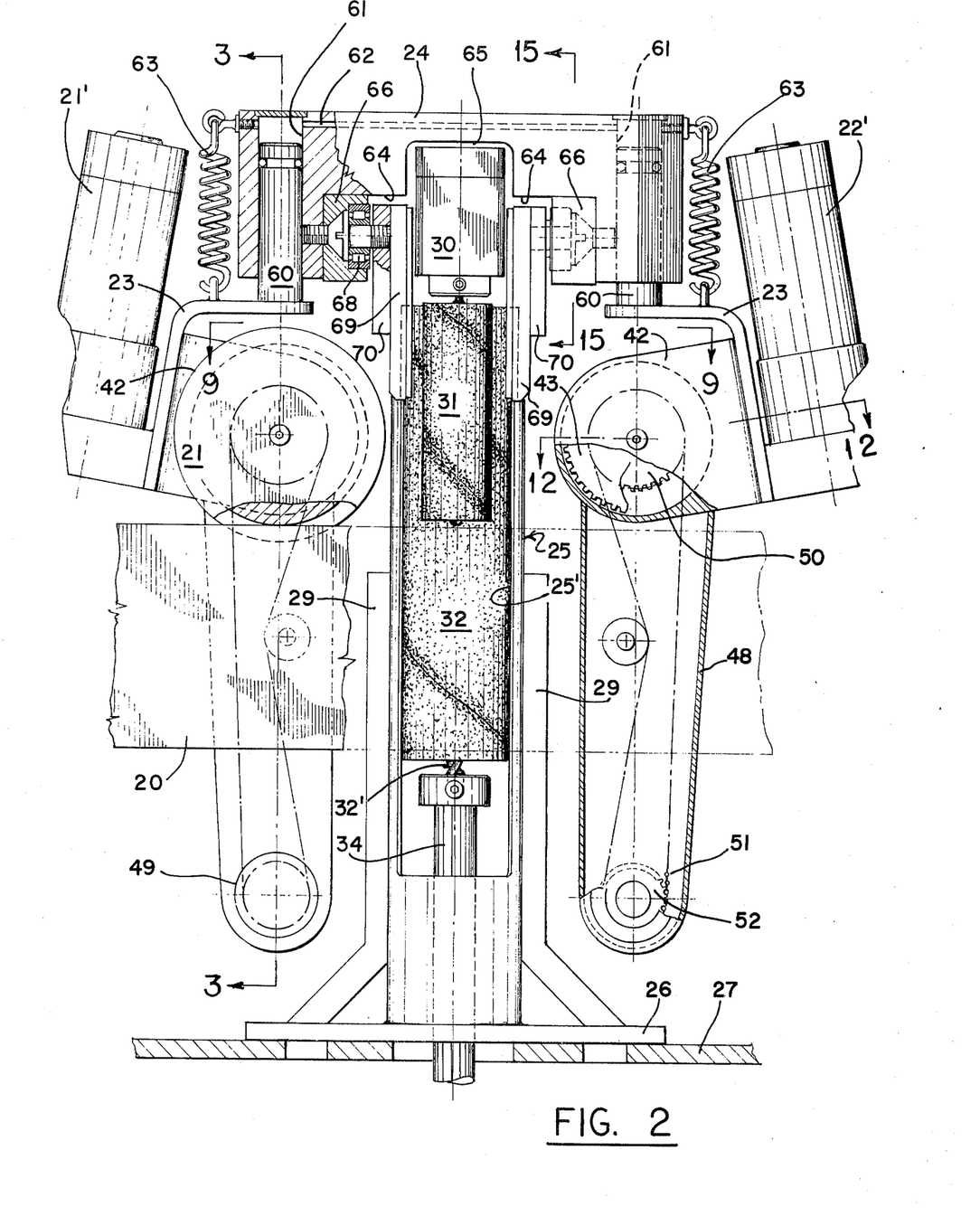
FIG. 2 is an enlarged view similar to FIG. 1 of the upper part of the rail cleaner showing the brushes in raised positions, parts being broken away and in section.

A gear housing block 30 is vertically slidable in the upper portion of post 25 and mounts the upper ends of the shafts for the rotatable brushes 31 and 32 (FIG. 2) which contact opposite sides of the conveyor rail 20, the post serving as a guide for the block 30, and the side of the post facing the rail is provided with a longitudinal opening 25' exposing the brush 32. The lower end of the shaft 32' of the larger brush 32 is connected by a coupling 33 to the upper end of a piston shaft 34 extending upwardly through housing wall 27 (FIG. 2). The piston shaft extends through a fluid cylinder 35 and is operable to raise and lower the brush 32 in a manner to be described. The cylinder is rotatably driven by a motor 36 to rotate the shaft 34 and the brush 32 connected thereto in a manner to be described.

In effect, the crosshead 24 is floatingly supported on the wheels 21 and 22 which ride on the conveyor rail 20 and the post 25 is supported at its upper end in the crosshead, so that the housing 28 and mechanism therein, together with the battery power supply hung therefrom, are all suspended from the crosshead supported on the wheels.

Referring to FIGS. 2, 3, 12 and 13, both wheels 21 and 22 are identical in the construction, mounting and drive. Each wheel is rotatably mounted on the outboard end of a worm wheel shaft 38 in antifriction bearing 39, and shaft 38 is journaled by anti-friction bearings 40 and 41 in a gear housing 42 connected to bracket 23 on the rear side of the wheel. A worm wheel 43 is secured on shaft 38 and is driven by a worm 44 connected to the shaft of the motor 21' or 22' by a gear train indicated generally at 46.

Figure 3:
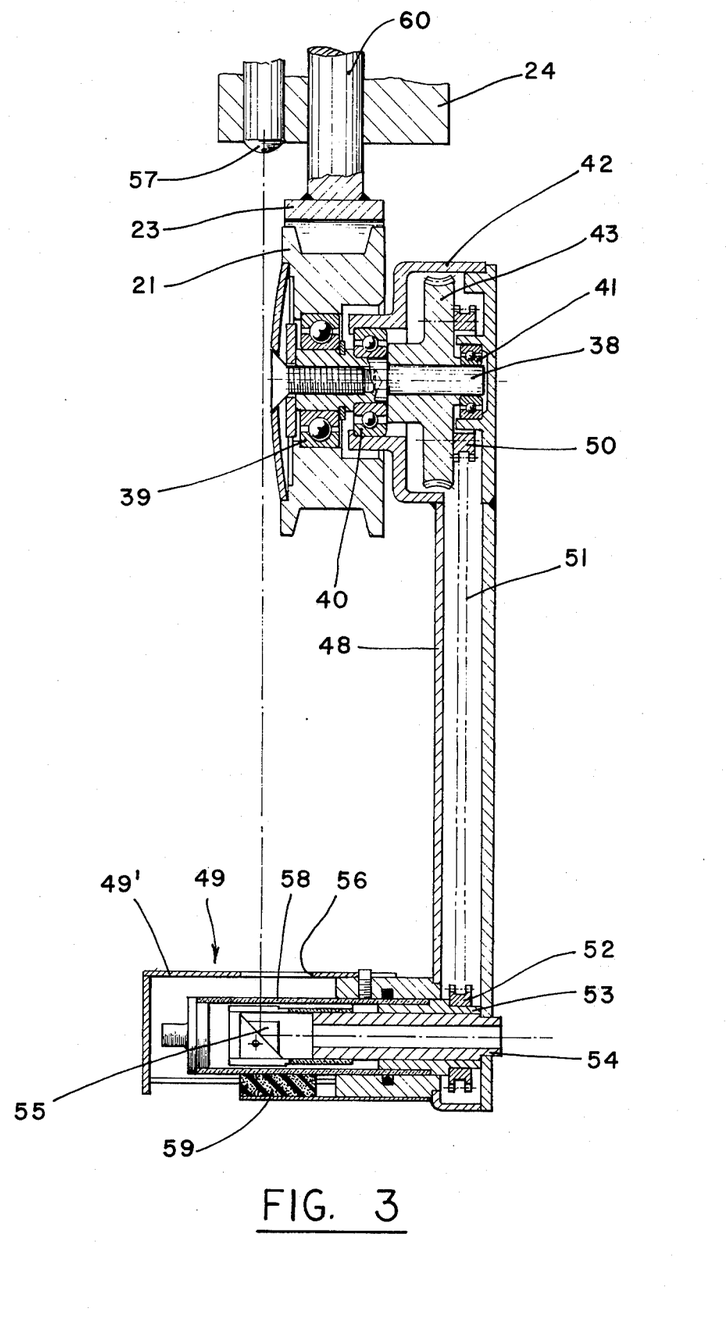
FIG. 3 is an enlarged sectional view on line 3–3 of FIG. 2.

Each gear housing 42 has a depending arm portion 48 with a cylindrical barrel indicated generally at 49 projecting forwardly from the lower end at right angles thereto. As shown in FIG. 3, the worm wheel 43 has a sprocket 50 thereon which is operatively connected by a chain 51 to a sprocket 52 on a tubular bushing 53 journaled on a fixed hollow shaft 54 secured to arm 48. A light source (not shown) mounted in shaft 54 projects a light beam onto a prism 55 therein which reflects it vertically upward through a slot 56 in the barrel cover 49' to an axially aligned photocell 57 in the crosshead 24. These beams are positioned close to the wheels 21 and 22 so as to be interrupted by obstructions along the rail and cause the brushes to raise and clear the obstruction. The bushing 53 is encircled by a transparent cylinder 58, and rotation thereof causes the cylinder to pass over the wiper bar 59 to continuously clean foreign matter therefrom. The electrical conductor wires for the photocells 57 and the light sources in shafts 54 may also pass through the conduits 29 alongside the post 25.

As shown in FIG. 2, each wheel 21 and 22 is floatingly mounted in the crosshead 24 by means of a plunger 60 extending upwardly from the bracket 23 into a bore 61 in the crosshead. The upper ends of bores 61 are interconnected by a passageway 62 in the crosshead and fluid is trapped therein. As the wheels pass over inclines or humps on the rail 20 the fluid allows the plungers to shift accordingly while being cushioned by the trapped fluid, thus insuring that both wheels are always equally in driving engagement with the rail. Tension springs 63 yieldingly restrain downward and turning movement of the wheels.

Figure 15:
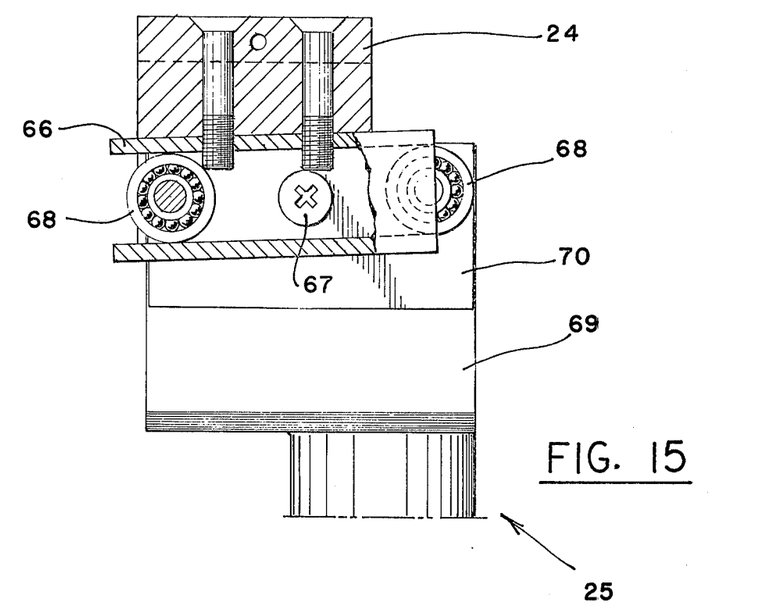
FIGS. 15 and 16 are partial sectional views on line 15—15 of FIG. 2 showing the extreme lateral positions of the crosshead relative to the post.
Figure 16:
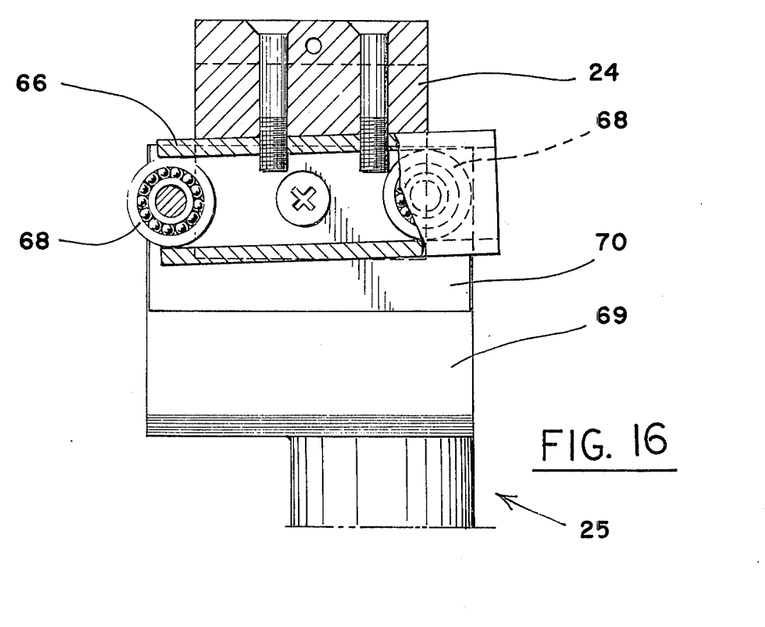

Referring to FIG. 2, the crosshead 24 has laterally extending notches 64 on opposite sides of the upper end of the post 25 and a medial transverse slot 65 extending upwardly between notches 64 above the top of the post for receiving the block 30 when it is moved vertically upward. Laterally extending channels 66 are mounted in notches 64 by screws 67 (FIG. 15) and form tracks for rollers 68 journaled on the post 25. As shown, inner and outer side plates 69 and 70 are secured to the upper end of the post and extend upwardly into notches 64, and the rollers 68 are journaled on the side plates 70. As shown in FIGS. 15 and 16, the tracks are preferably slightly inclined downwardly about 2° toward the rail 20 to assure good contact between brush 32 and the rear side of the rail 20.

As the supporting wheels 21 and 22 follow curves and turns in the rail 20, the rollers 68 can move laterally on the tracks 66 between the positions of FIGS. 15 and 16 to allow the mast 25 and the brushes 31 and 32 to maintain uniform relationship to the rail, so that the wheels always follow the rail without lateral friction or binding. This relative movement of the crosshead does not materially affect the alignment between the photocells 57 and the light source reflecting prisms 55 as both are carried by the crosshead and the barrels 49 carrying the prisms do not swing far enough to cause misalignment.

Figure 5:
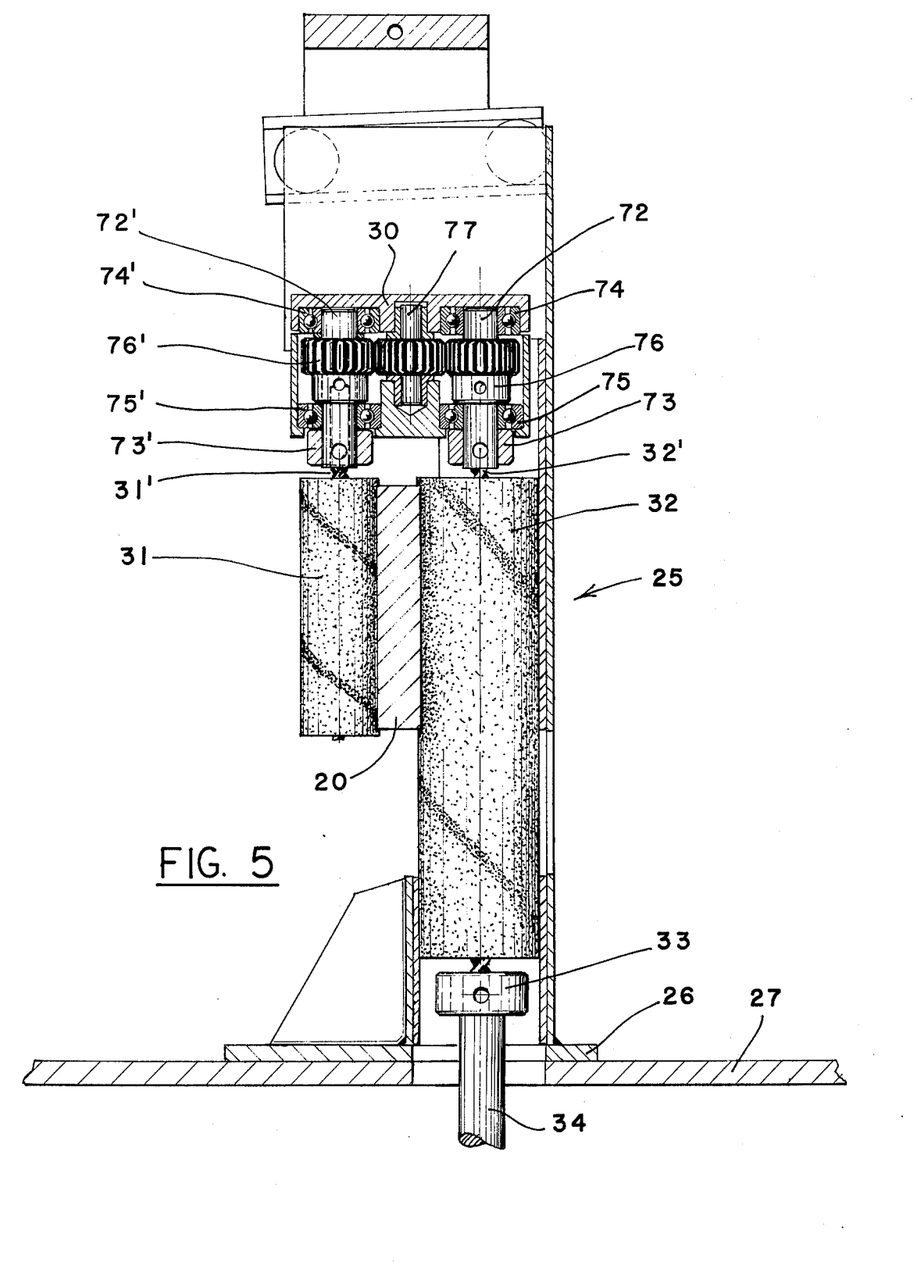
FIG. 5 is an enlarged sectional view on line 5—5 of FIG. 1.

The upper end of brush shaft 32' is operatively connected to the upper end of brush shaft 31' so that when brush 32 is axially rotated by piston shaft 34 the brush 31 is axially rotated. As shown in FIG. 5, the upper end of brush shaft 32' telescopes into the lower end of a gear shaft 72 and is secured thereto by a coupling 73. The shaft 72 is journaled in gear housing 30 in anti-friction bearings 74 and 75, between which a gear 76 is secured on the shaft 72. The upper end of brush shaft 31' is similarly telescoped into the lower end of a gear shaft 72' and is secured thereto by a coupling 73'. The shaft 72' is journaled in bearings 74' and 75' in housing 30, and a gear 77 is secured on shaft 72' between the bearings. A pinion gear 77 is journaled in housing 30 between and meshing with gears 76 and 76', so that axial rotation of brush 32 axially rotates brush 31 in the same direction.

Figure 4:
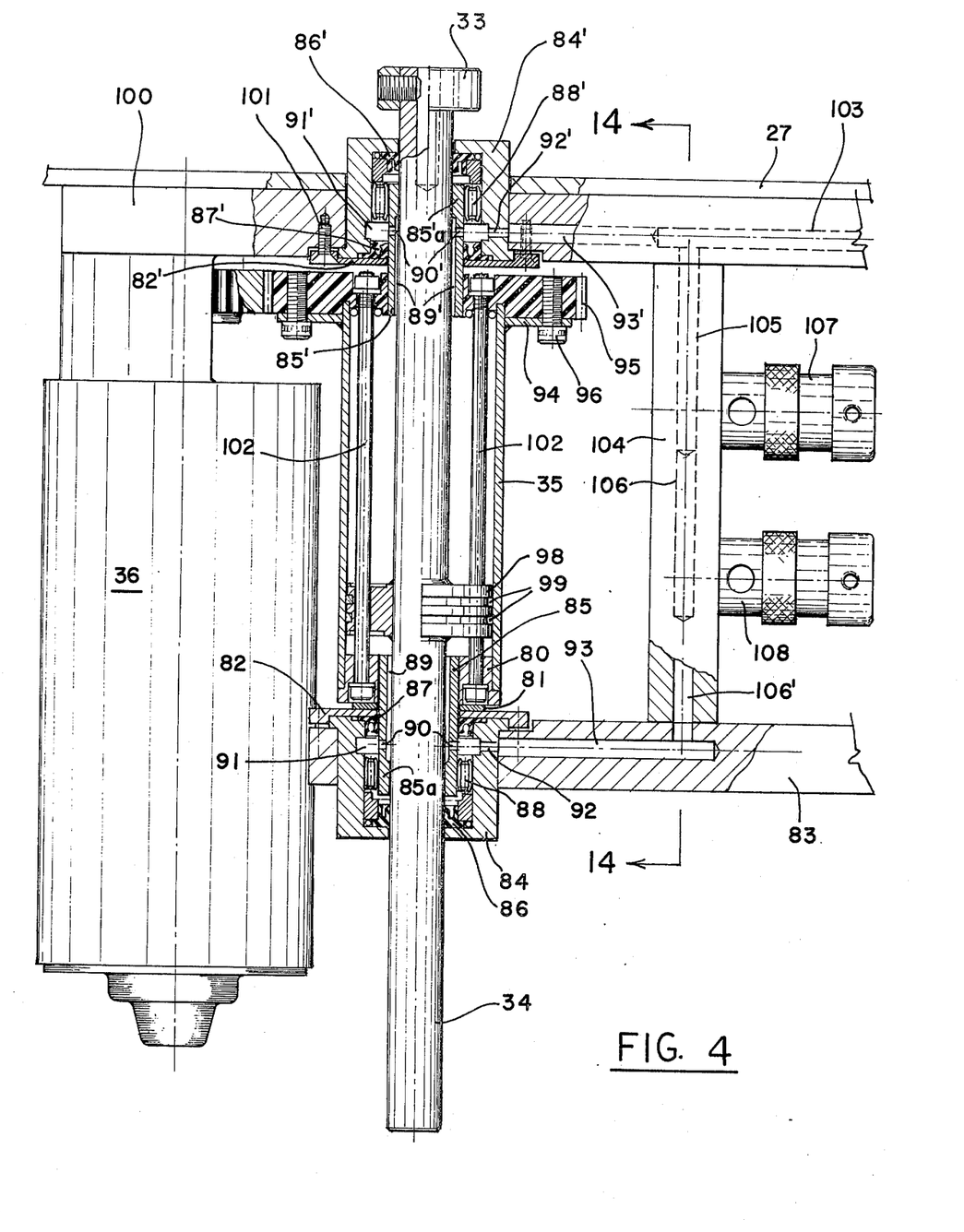
FIG. 4 is an enlarged view similar to FIG. 1 of the lower part of the rail cleaner, parts being broken away and in section, and certain parts being removed for the sake of clarity.

As shown in FIG. 4, the cylinder 35 has a lower cylinder head 80 supported on a thrust bearing washer 81 which rests on a cap plate 82 secured to a lower frame plate 83. The cap plate covers the upper end of a cup-shaped bearing and seal casing 84 surrounding the shaft, and a bushing 85 encircling the shaft extends through cylinder head 80, wahser 81 and cap 82 into casing 84 and is slidably mounted at its lower end 85a on shaft 34 within the casing. A seal 86 surrounds the shaft in abutment with the end wall of the casing and another seal 87 surrounds the shaft in abutment with cap plate 82. A needle bearing 88 in casing 84 journals the outer surface of the ower end 85a of the bushing.

Above its lower end the bushing 85 is radially spaced from the shaft to provide an annular space 89 communicating with the interior of cylinder 35, and radial ports 90 in the bushing connect with annular opening 91 between the seals 86 and 87. A port 92 in the wall of casing 84 connects space 89 with a fluid pressure passageway 93 in frame plate 83.

The upper end of cylinder 35 is secured in annular plate 94 which is bolted to a gear 95 by bolts 96 and forms the upper head of the cylinder. The piston shaft 34 has a piston 98 secured thereon slidable in the cylinder 34 with sealing rings 99 in the piston. From the piston 98 the shaft 34 extends downwardly slidably through bushing 85 and casing 84 and upwardly through a bushing 85' secured at its lower end in gear 95, and shaft 34 is slidable in the upper end 85'a of bushing 85'. The bushing 85' is journaled in a needle bearing 88' in an inverted cup-shaped casing 84' similar to casing 84, and casing 84' is mounted in an upper frame member 100 which is secured to upper housing plate 27. Preferably, the casing 84' is held in frame member 100 by a cap plate 82' secured thereto by screws 101. The needle bearing 88' is located between upper and lower seals 86' and 87' encircling the shaft 34.

Below its upper end 85'a the bushing 85' is radially spaced from shaft 34 to provide an annular space 89' communicating with the interior of cylinder 35, and radial ports 90' in the bushing connect with annular opening 91'. A port 92' in the wall of the casing 84' connects space 89' with a fluid pressure passageway 93' in frame member 100.

The gear 95 and lower cylinder head 80 are clamped to the ends of cylinder 35 by tie bolts 102 on which the piston 98 is slidable, so that the piston can move axially as it is rotated with the cylinder 35, and the tie bolts transmit the rotary drive from the gear 95 to the piston shaft. This construction avoids the necessity of a spline or keyway on the piston shaft which would make it extremely difficult to maintain a seal around the shaft. Fluid pressure supply port 103 in frame member 100 is connected by passageways 105 and 106, respectively, in cross-frame member 104 to 3-way solenoid valves 107 and 108, which are connected by passageways 105' and 106' to passageways 93' and 93, respectively.

Figure 14:
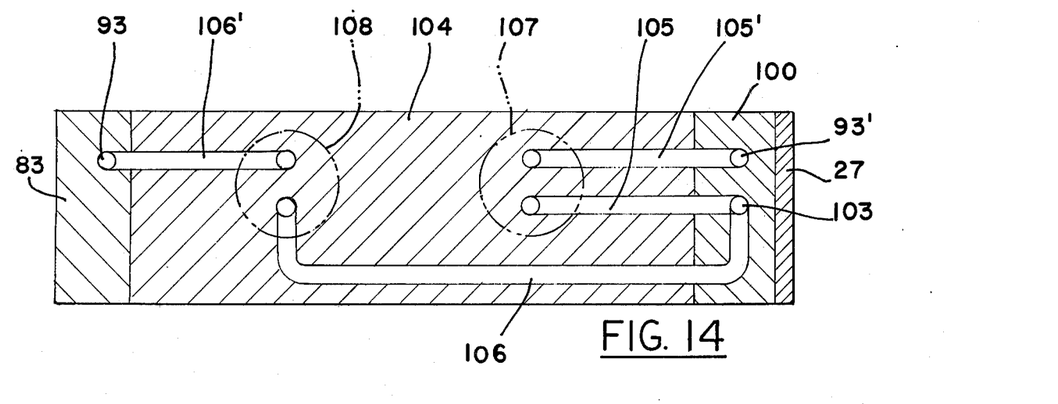
FIG. 14 is a somewhat schematic sectional view on line 14—14 of FIG. 4.

Referring to FIGS. 4 and 14, when passageway 103 is connected by passageway 105, valve 107 and passageway 105' to passageway 93', the piston will be forced downwardly and fluid will exhaust through passageways 93 and 106' and valve 108. When passageway 106' to passageway 93, the piston will be raised and fluid will exhaust through passageways 93' and 105' and valve 107.

Figure 6:
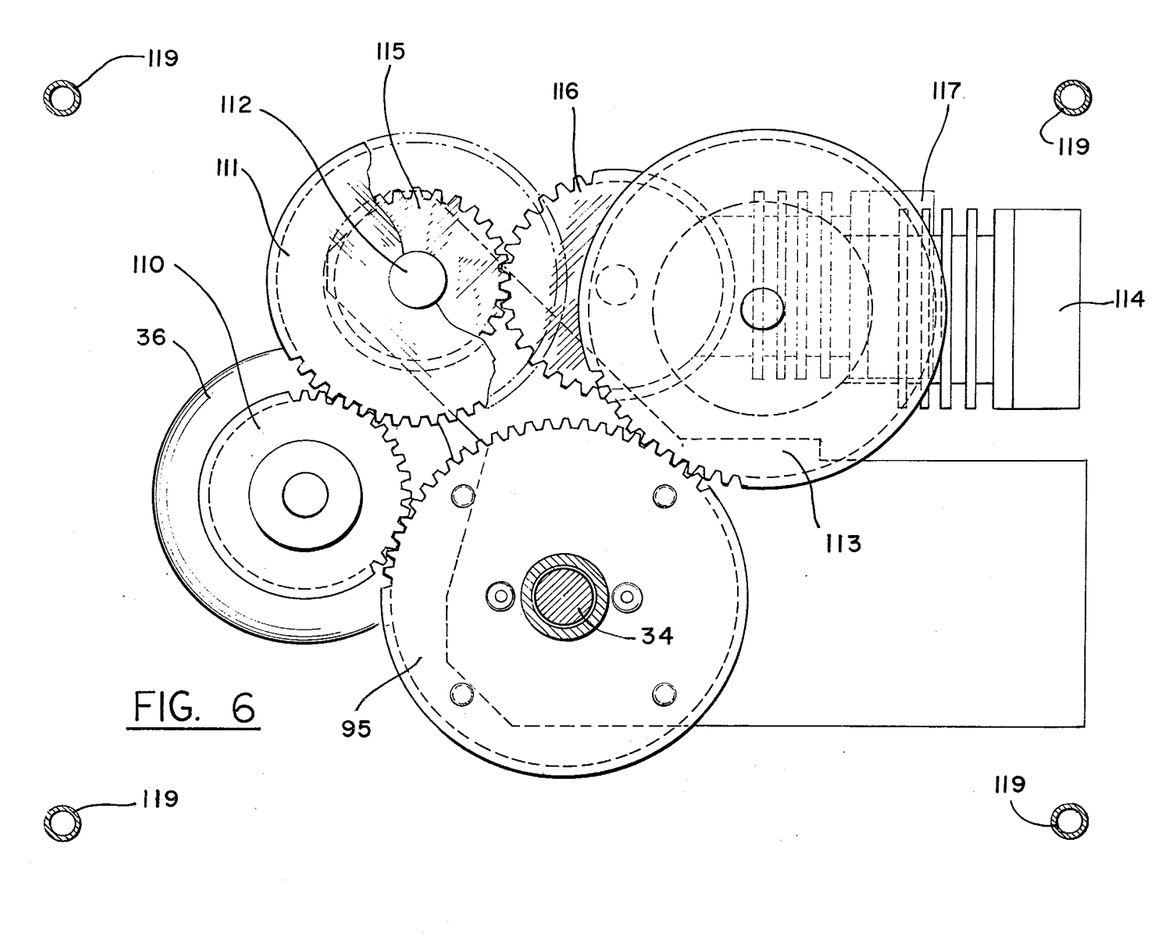
FIG. 6 is a plan sectional view as on line 6—6 of FIG. 1.
Figures 7, 8:
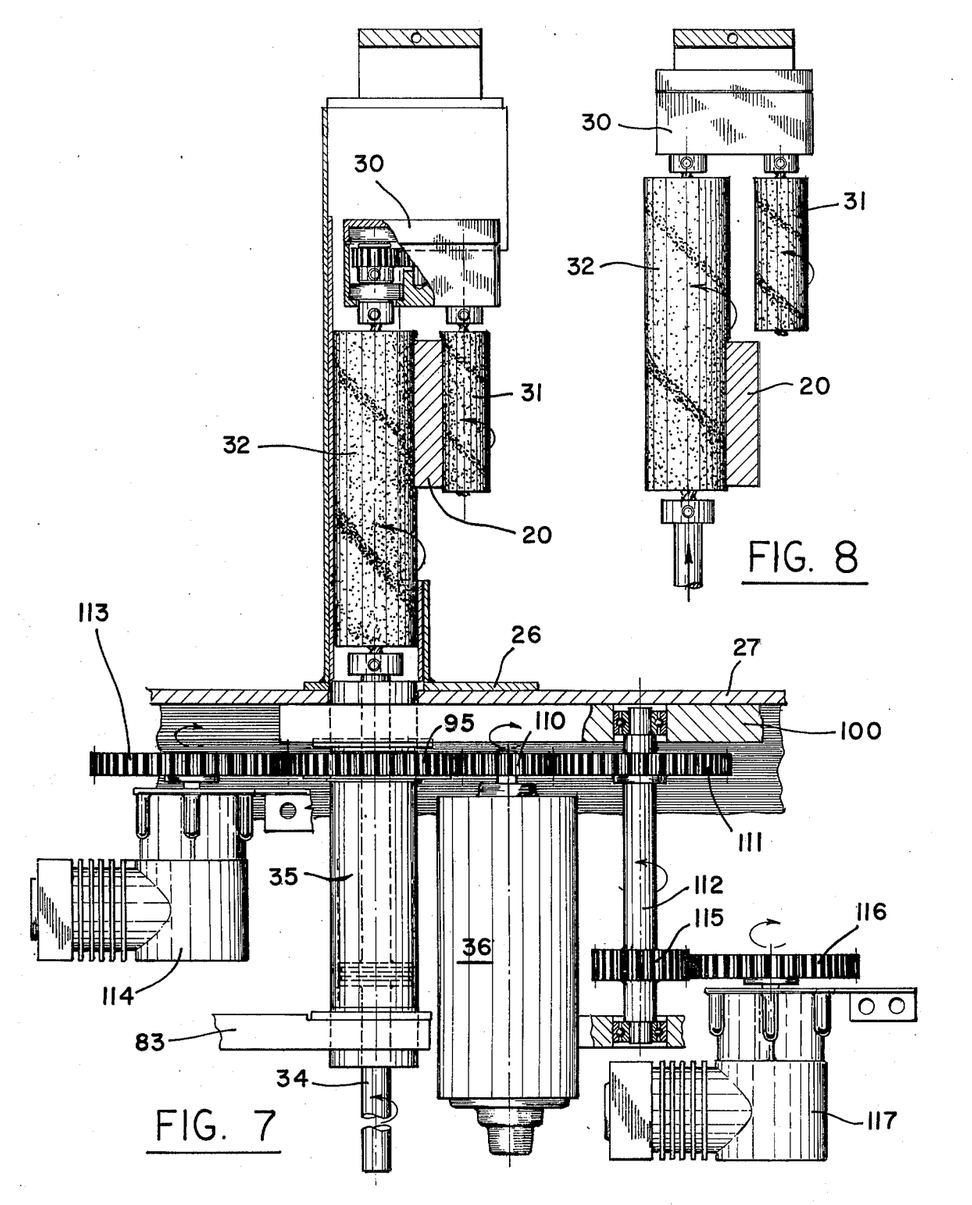
FIG. 7 is a sectional view on line 7—7 of FIG. 1, with the lower parts rearranged schematically to show the operating connections between the motor and the brushes and between the motor and the compressors.
FIG. 8 is a fragmentary view similar to FIG. 7, showing the raised position of the brushes.

Referring to schematic FIG. 7, the gear 95 secured to the top of cylinder 35 is shown driven by a gear 110 on the shaft of motor 36, and gear 110 also drives a gear 111 on a laterally spaced shaft 112 journaled in frame members 100 and 83. Gear 95 drives a gear 113 to operate an air compressor 114 which is suitably connected to passageway 103 (FIG. 4) to supply fluid thereto. A pinion gear 115 is secured on shaft 112 and drives the gear 116 which operates an air compressor 117 for pressurizing a circulation system for supplying oil to the spray nozzles 118 through tubes 119 (FIG. 1) to direct a curtain of oil forming a coating on the rail to protect the cleaned surfaces of the rail from corrosion. The actual gear train shown in FIGS. 1 and 6 for driving the compressors 114 and 117 is somewhat differently arranged but accomplishes the same purpose.

Figure 9:
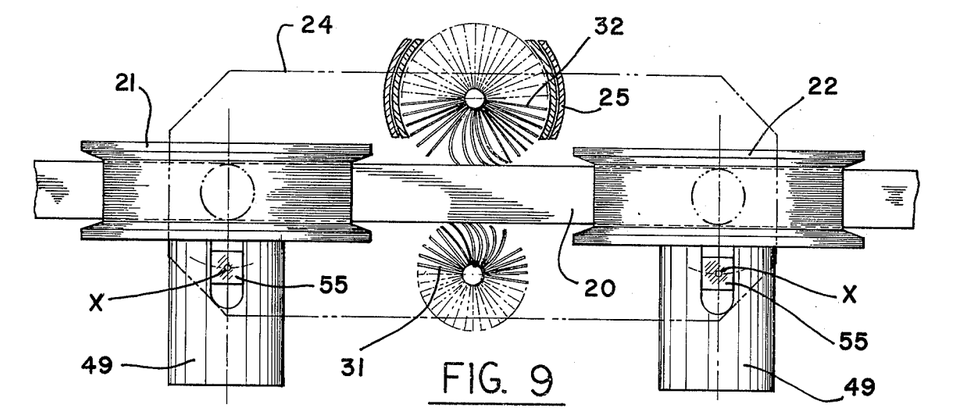
FIG. 9 is a somewhat schematic plan sectional view as on line 9—9 of FIG. 2 showing the supporting wheels on a straight section of conveyor rail and the alignment of the photocells with the light sources.
Figure 10:
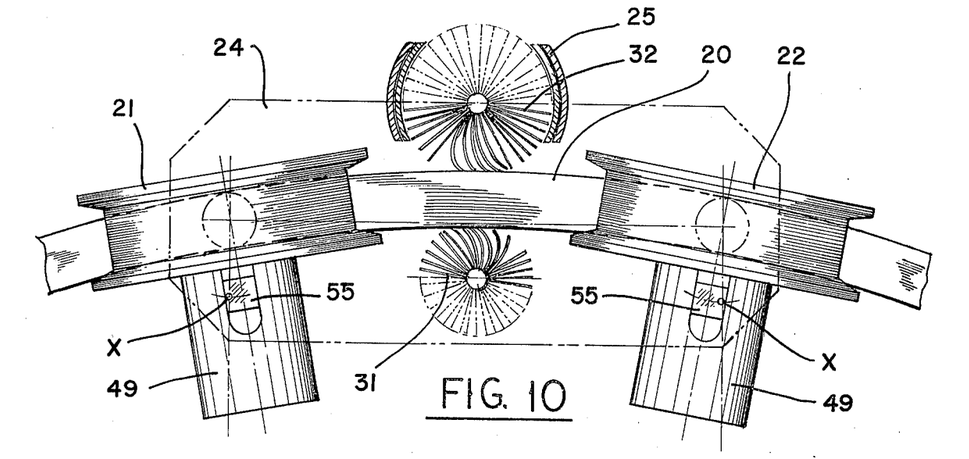
FIG. 10 is a similar view showing the wheels supported on a curved section of conveyor rail.
Figure 11:
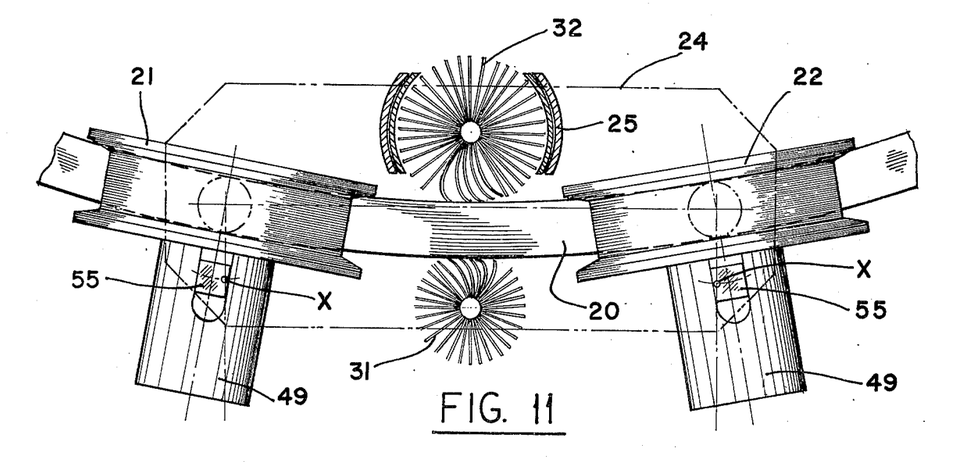
FIG. 11 is a similar view showing the wheels supported on a reversely curved section of conveyor rail.
Figure 12:
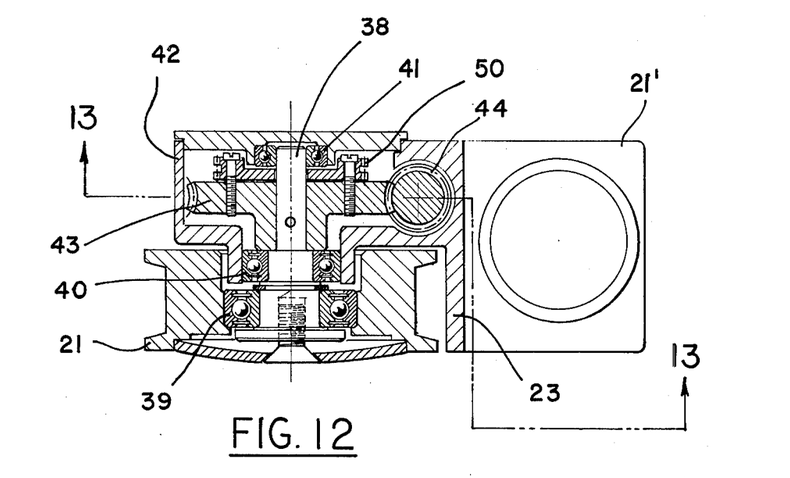
FIG. 12 is a plan sectional view on lline 12—12 of FIG. 2.
Figure 13:
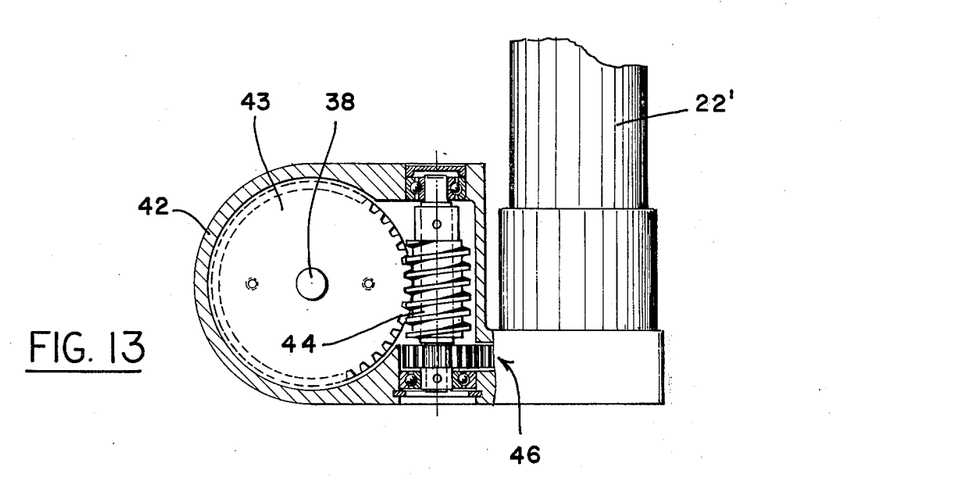
FIG. 13 is a sectional view on line 13—13 of FIG. 12.

Referring to FIGS. 9 – 11, in FIG. 9 the wheels 21 and 22 are supported on a straight section of conveyor rail 20, the crosshead 24 centered over the rail and the brushes 31 and 32 rotatably engaging opposite side surfaces of the rail. In this position the vertical axis X of each photocell 57 passes through the center of the prism 55 in the barrel 49 carried by the wheel housing below, each prism being represented by a square.

As the wheels 21 and 22 follow around a section of rail 20 curved in one direction as in FIG. 10 or in the reverse direction as in FIG. 11, the crosshead 24 shifts laterally of the rail a slight amount to compensate for the turning of the wheels but because the barrels 49 are carried by the wheels and the wheels are supported by the crosshead, the center of each prism shifts only a very slight amount so that the axis X of each light beam passing through the prism shifts correspondingly and the beam still passes through the photocell above. Also, it is not necessary that the axes of the light beams be absolutely vertical, as the position of the prisms 55 can be adjusted slightly to insure that the light beams intersect the photocells in all positions of the wheels.

In the operation of the improved conveyor rail cleaning machine, the wheels 21 and 22 are driven by their individual motors 21' and 22' to move the machine along the rail in either direction. As previously stated, the motors are supplied with electric current from batteries carried in a box (not shown) hung from the bottom of the housing 28. As the machine travels along the rail with the brushes in the lowered position shown in FIGS. 1, 5, and 7, they are rotated in engagement with opposite sides of the rail by the piston shaft 34 driven by motor 36 in the manner previously described.

When a supporting bracket or other obstruction on the side of the rail contacted by brush 31 passes through the light beam aligned with the photocell 57 at the leading edge of the crosshead 24, the solenoid valve 108 is activated to connect the fluid pressure supply to the lower end of cylinder 35 to raise the piston and the brushes to the position of FIG. 2 wherein the brush 31 is raised above the obstruction. When the obstruction has passed beyond the light beam, solenoid valve 107 is activated to connect the fluid supply to the upper end of the cylinder 35 to lower the piston and the brushes to the position of FIG. 1.

The motors 21' and 22' continuously rotate the transparent cylinders 58 past the wiper bars 59 to keep the cylinders free of any foreign material so as not to obscure the light beams transmitted through the prisms 55.

As previously described, the plungers 60 of driven wheels 21 and 22 are rotatably mounted in the crosshead 24 to allow the wheels to follow around curves in the conveyor rail and the crosshead is laterally movable relative to the post 35 to compensate for such movement. Also, the wheels are floatably mounted so as to be self-leveling to accommodate the inclines or uneven portions of the conveyor rail. The raising of the gear housing 39 operatively connecting the upper ends of the brushes is accommodated by the slot 65 within the crosshead so that minimal working space above the conveyor rail is required for passage of the improved rail cleaning machine.

It will be apparent that a compact and durable rail cleaning machine has been provided which overcomes the difficulties had with prior rail cleaners, and which is easily maintained and repaired. The power supply is self-contained so that it is not necessary to use long conductor cords plugged into available power supply receptacles and consequently the operation of the cleaning machine is safer, cleaner and more efficient.

We claim:

1. An automatic cleaner for riding on and cleaning an overhead conveyor rail, comprising a crosshead, a pair of brackets rotatably supported on said crosshead, a supporting wheel journaled in said brackets for rolling on top of the conveyor rail, a drive motor on each bracket for driving each wheel, an upright tubular post laterally movably mounted at its upper end in said crosshead, a housing secured to the lower end of said post, vertically disposed axially rotatable brushes for contacting opposite sides of said rail, one of said brushes positioned in said post, fluid motor means below and secured to said housing for raising and lowering said one brush, means for continuously rotating said one brush, and means operatively connecting said brushes for simultaneous rotation and vertical movement.

2. An automatic cleaner as described in claim 1, wherein photocells are mounted in said crosshead adjacent said brackets and the brackets have depending arms on which light beam sources are mounted in vertical alignment with said photocells for actuating the brush raising and lowering means when an obstruction along the rail intersects said light beams.

3. An automatic cleaner as described in claim 2, wherein the light sources are mounted within transparent tubes rotatable on said depending arms, and driving means operatively connects said wheels to said tubes for rotating and cleaning the tubes.

4. An automatic cleaner as described in claim 1, wherein the means operatively connecting the brushes is mounted in a gear housing which is vertically movable in said upright post, and a slot in said crosshead receives said housing in its raised position.

5. An automatic cleaner as described in claim 1, wherein lateral tracks are mounted on said crosshead and rollers on the upper end of said post are rollably supported on said tracks.

6. An automatic cleaner as described in claim 5, wherein the lateral tracks are inclined downwardly toward said conveyor rail approximately 2° to the horizontal.

7. An automatic cleaner as described in claim 1, wherein the brackets have pistons rotatably and floatably mounted in vertically disposed fluid cylinders in said crosshead.

8. An automatic cleaner as described in claim 7, wherein spring means yieldingly connect said brackets to said crosshead to restrain downward and rotary movement of the brackets when not resting on the rail.

9. An automatic cleaner as described in claim 7, wherein the fluid cylinders are interconnected to allow the pistons to accommodate the wheels to an uneven rail while being cushioned by the fluid in said cylinders.

10. An automatic cleaner as described in claim 8, wherein the fluid cylinders are interconnected to allow the pistons to accommodate the wheels to an uneven rail while being cushioned by the fluid in said cylinders.

11. An automatic cleaner as described in claim 1, wherein the fluid means for raising and lowering said one brush comprises a vertically disposed rotatable cylinder and a piston therein having a shaft axially slidable in said cylinder and connected to said brush, and fluid supply and exhaust means connected to the ends of said cylinder.

12. An automatic cleaner as described in claim 11, wherein means are provided for slidably and non-rotatably mounting said piston in said cylinder, and means for rotating said cylinder to rotate said piston therewith.

13. An automatic cleaner as described in claim 12, wherein the means slidably and non-rotatably mounting said piston in said cylinder comprises a longitudinal tie rod connecting the end walls of the cylinder and extending slidably through said piston.

14. An automatic cleaner as described in claim 11, wherein the piston rod is journaled above and below said cylinder in upper and lower supporting frame members, and the bottom of said cylinder is rotatably supported on said lower frame member.

15. An automatic cleaner as described in claim 12, wherein the piston rod is journaled above and below said cylinder in upper and lower supporting frame members, and the bottom of said cylinder is rotatably supported on said lower frame member.

16. An automatic cleaner as described in claim 12, wherein the means for rotating said cylinder comprises a motor, and an air pump driven by said motor causes oil to be supplied to a spray nozzle on said supporting plate for coating said conveyor rail.

17. An automatic cleaner as described in claim 13, wherein the means for rotating said cylinder comprises a motor, and an air pump driven by said motor causes oil to be supplied to a spray nozzle on said supporting plate for coating said conveyor rail.

18. An automatic cleaner as described in claim 15, wherein the means for rotating said cylinder comprises a motor, and an air pump driven by said motor causes oil to be supplied to a spray nozzle on said supporting plate for coating said conveyor rail.

19. An automatic cleaner as described in claim 1, wherein the power supply for rotating and raising and lowering the brushes is suspended from said housing.

* * * * *

UNITED STATES PATENT OFFICE
CERTIFICATE OF CORRECTION

PATENT NO. : 4,033,285
DATED : July 5, 1977
INVENTOR(S) : THOMAS E. DUGLE and THOMAS L. WEBB It is certified that error appears in the above-identified patent and that said Letters Patent are hereby corrected as shown below:

Column 5, after line 32, insert --103 is connected by passageway 106, valve 108 and passageway--.

Column 6, line 42, "39" should read --30--.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*